(12) United States Patent
Dewan et al.

(10) Patent No.: US 8,364,601 B2
(45) Date of Patent: Jan. 29, 2013

(54) METHODS AND SYSTEMS TO DIRECTLY RENDER AN IMAGE AND CORRELATE CORRESPONDING USER INPUT IN A SECURE MEMORY DOMAIN

(75) Inventors: Prashant Dewan, Hillsboro, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 12/347,576

(22) Filed: Dec. 31, 2008

(65) Prior Publication Data

US 2010/0169666 A1 Jul. 1, 2010

(51) Int. Cl.
G06F 7/04 (2006.01)
G06F 17/30 (2006.01)
H04N 7/16 (2006.01)

(52) U.S. Cl. .............. 705/65; 705/50; 705/64; 726/26
(58) Field of Classification Search .............. 726/26; 380/20–29; 715/773; 386/95, 290
See application file for complete search history.

(56) References Cited

U.S. PATENT DOCUMENTS

| | | | |
|---|---|---|---|
| 5,301,287 A | 4/1994 | Herrell et al. | |
| 5,312,673 A | 5/1994 | Dressler | |
| 5,379,400 A | 1/1995 | Barakat et al. | |
| 5,619,723 A | 4/1997 | Jones et al. | |
| 5,634,043 A | 5/1997 | Self et al. | |
| 5,687,370 A | 11/1997 | Garst et al. | |
| 5,696,869 A * | 12/1997 | Abecassis | 386/290 |
| 5,751,989 A | 5/1998 | Harrison | |
| 5,926,549 A | 7/1999 | Pinkas | |
| 5,944,821 A | 8/1999 | Angelo | |
| 5,966,531 A | 10/1999 | Skeen et al. | |
| 5,987,557 A | 11/1999 | Ebrahim | |
| 5,991,881 A | 11/1999 | Conklin et al. | |
| 6,061,449 A * | 5/2000 | Candelore et al. | 380/28 |
| 6,101,586 A | 8/2000 | Ishimoto et al. | |

(Continued)

FOREIGN PATENT DOCUMENTS

| WO | 98/47072 A1 | 10/1998 |
|---|---|---|
| WO | 01/42874 A2 | 6/2001 |

OTHER PUBLICATIONS

Jakobsson, et al. "Hardware-Enforced Isolation." Crimeware: Understanding New Attacks and Defenses. Addison-Wesley Professional XP007913774, ISBN: 978-0-321-50195-0 Section 15.3.5 Apr. 16, 2008. p. 608. Table of Contents included. 9 pages.

(Continued)

*Primary Examiner* — Calvin Loyd Hewitt, II
*Assistant Examiner* — Cristina Owen Sherr
(74) *Attorney, Agent, or Firm* — Garrett IP, LLC (57) ABSTRACT

Methods and systems to assign an application and a video frame buffer to a protected memory domain to render an image of a keyboard from the protected memory domain to a random position of the video frame buffer and correlate user input from a pointing device to the rendered keyboard image. The keyboard image may be randomly repositioned following a user input. The keyboard image may be rendered over a secure user image. An acknowledgment image may be rendered from the protected memory domain to a random position of the video frame buffer, and may be randomly repositioned in response to a user input that does not correlate to the acknowledgment image. User inputs that do not correlate to a randomly positioned image may be counted, and one or more processes may be aborted when the number of non-correlated user inputs exceeds a threshold.

7 Claims, 7 Drawing Sheets

U.S. PATENT DOCUMENTS

| | | | |
|---|---|---|---|
| 6,105,137 | A | 8/2000 | Graunke et al. |
| 6,163,834 | A | 12/2000 | Garcia et al. |
| 6,321,276 | B1 | 11/2001 | Forin |
| 6,487,643 | B1 | 11/2002 | Khare et al. |
| 6,496,847 | B1 | 12/2002 | Bugnion et al. |
| 6,542,919 | B1 | 4/2003 | Wendorf et al. |
| 6,553,438 | B1 | 4/2003 | Coffman et al. |
| 6,567,897 | B2 | 5/2003 | Lee et al. |
| 6,571,333 | B1 | 5/2003 | Jain et al. |
| 6,658,515 | B1 | 12/2003 | Larson et al. |
| 6,671,791 | B1 | 12/2003 | McGrath |
| 6,684,305 | B1 | 1/2004 | Deneau |
| 6,738,882 | B1 | 5/2004 | Gau |
| 6,751,720 | B2 | 6/2004 | Barroso et al. |
| 6,751,737 | B1 | 6/2004 | Russell et al. |
| 6,760,787 | B2 | 7/2004 | Forin |
| 6,823,433 | B1 | 11/2004 | Barnes et al. |
| 6,832,257 | B1 | 12/2004 | Gamo |
| 6,931,540 | B1 | 8/2005 | Edwards et al. |
| 6,961,852 | B2 | 11/2005 | Craft |
| 6,996,551 | B2 | 2/2006 | Hellerstein et al. |
| 7,010,630 | B2 | 3/2006 | Pagan |
| 7,028,229 | B2 | 4/2006 | McGuire et al. |
| 7,093,295 | B1 | 8/2006 | Saito |
| 7,103,779 | B2 | 9/2006 | Kiehtreiber et al. |
| 7,225,325 | B2 | 5/2007 | Rhoades |
| 7,328,453 | B2 | 2/2008 | Merkle, Jr. et al. |
| 7,409,472 | B2 | 8/2008 | Iwatani et al. |
| 7,478,394 | B1 | 1/2009 | de Dinechin et al. |
| 7,506,122 | B1 | 3/2009 | Agesen et al. |
| 7,542,026 | B2 | 6/2009 | Pagan |
| 7,581,256 | B2 | 8/2009 | Cockerille et al. |
| 7,587,612 | B2 | 9/2009 | Savagaonkar et al. |
| 7,594,124 | B2 | 9/2009 | Durham et al. |
| 7,603,484 | B2 | 10/2009 | Dai et al. |
| 7,669,242 | B2 | 2/2010 | Sahita et al. |
| 2001/0014157 | A1 | 8/2001 | Hashimoto et al. |
| 2002/0029308 | A1 | 3/2002 | Babaian et al. |
| 2002/0082824 | A1 | 6/2002 | Neiger et al. |
| 2002/0120871 | A1 | 8/2002 | Watkins et al. |
| 2002/0129212 | A1 | 9/2002 | Lee et al. |
| 2003/0005239 | A1 | 1/2003 | Dover |
| 2003/0005272 | A1 | 1/2003 | Nalawadi et al. |
| 2003/0037237 | A1 | 2/2003 | Abgrall et al. |
| 2003/0061540 | A1 | 3/2003 | Lee et al. |
| 2003/0097496 | A1 | 5/2003 | Gabryjelski |
| 2003/0135685 | A1 | 7/2003 | Cowan |
| 2003/0159055 | A1 | 8/2003 | Robbins et al. |
| 2003/0217250 | A1 | 11/2003 | Bennett et al. |
| 2003/0229794 | A1 | 12/2003 | Sutton et al. |
| 2003/0229808 | A1 | 12/2003 | Heintz et al. |
| 2003/0235310 | A1 | 12/2003 | Saito et al. |
| 2004/0030911 | A1 | 2/2004 | Isozaki et al. |
| 2004/0039924 | A1 | 2/2004 | Baldwin et al. |
| 2004/0044872 | A1 | 3/2004 | Scott |
| 2004/0153998 | A1 | 8/2004 | McGuire et al. |
| 2004/0221200 | A1 | 11/2004 | Armstrong et al. |
| 2004/0226009 | A1 | 11/2004 | Mese et al. |
| 2004/0268013 | A1 | 12/2004 | Pagan |
| 2005/0027988 | A1 | 2/2005 | Bodrov |
| 2005/0132122 | A1 | 6/2005 | Rozas |
| 2005/0138417 | A1 | 6/2005 | McNerney et al. |
| 2005/0198051 | A1 | 9/2005 | Marr et al. |
| 2005/0213768 | A1 | 9/2005 | Durham et al. |
| 2005/0216577 | A1 | 9/2005 | Durham et al. |
| 2005/0223220 | A1 | 10/2005 | Campbell et al. |
| 2005/0278499 | A1 | 12/2005 | Durham et al. |
| 2005/0278563 | A1 | 12/2005 | Durham et al. |
| 2005/0289311 | A1 | 12/2005 | Durham et al. |
| 2005/0289542 | A1 | 12/2005 | Uhlig et al. |
| 2006/0026569 | A1 | 2/2006 | Oerting et al. |
| 2006/0110136 | A1* | 5/2006 | Abecassis ............... 386/95 |
| 2006/0156398 | A1 | 7/2006 | Ross et al. |
| 2006/0161761 | A1 | 7/2006 | Schwartz et al. |
| 2006/0236125 | A1 | 10/2006 | Sahita et al. |
| 2006/0294596 | A1 | 12/2006 | Govindarajan et al. |
| 2007/0005935 | A1 | 1/2007 | Khosravi et al. |
| 2007/0005957 | A1 | 1/2007 | Sahita et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0156999 | A1 | 7/2007 | Durham et al. |
| 2008/0077767 | A1 | 3/2008 | Khosravi et al. |
| 2008/0115078 | A1* | 5/2008 | Girgaonkar ............... 715/773 |
| 2009/0172814 | A1 | 7/2009 | Khosravi et al. |

OTHER PUBLICATIONS

European Search Report received for the EP Application No. 09252894, mailed on Nov. 12, 2010. 5 pages.

Windows Platform Design Notes, "Standardizing Out-Of-Band Management Console Output and Terminal Emulation (VT-UTF8 and VT1100+)", Designing Hardware for the Microsoft® Windows® Family of Operating Systems, Draft Version 0.90, Oct. 24, 2001, 15 pages.

Apple Computer, Inc., "Mac OS X ABI Mach-O File Format Reference", (copyright 2003, 2009 Apple, Inc ), Apr. 2, 2009, 67 pages.

Collins, "Intel's System Management Mode", 1999, 5 pages Available at: http://www.rcollins.org/ddj/Jan97/Jan97.html.

Webopedia, "DMA", Nov. 11, 2003, 2 pages Available at: http://www.webopedia.com/TERM/D/DMA.html.

Duc, et al.; "Crypto Page: An Efficient Secure Architecture with Memory Encryption, Integrity and Information Leakage Protection", Computer Security Applications Conference, Dec. 2006, 10 Pages.

Grevstad, "CPU-Based Security. The NX Bit", Windows XP SP2 Stars AMD Antivirus Feature, May 24, 2004, 3 Pages. Available at: http://www.hardwarecentral.com/reviews/article.php/12095_3358421.

International Preliminary Report on Patentability received for PCT Patent Application No. PCT/US2005/022577, mailed on Jan. 9, 2007, 6 Pages.

International Search Report for PCT Patent Application No. PCT/US2005/022577, mailed on Nov. 24, 2005, 3 Pages.

Levy, et al, "Hiding Your Wares: Transparently Retrofitting Memory Confidentiality into Legacy Applications", Communications, ICC IEEE international Conference on Jun. 24-28, 2007, pp. 1368-1372 Available at: http://ieeexplore.ieee.org/xpl/login.jsp?tp=&arnumber=4288901&url=ht.

Markatos, et al., "User-Level DMA without Operating System Kernel Modification", HPCA '97 Proceedings of the 3rd IEEE Synposium on High-Performance Computer Architecture on Feb. 1-5, 1997, 1 page Available at: http://dl.acm.org/citation.cfm?id=822703.

Microsoft Corporation, "Microsoft Portable Executable and Common Object File Format Specification", Revision 6.0, Feb. 1999, 74 pages.

Notice of Allowance received for U.S. Appl. No. 11/171,859, mailed on Jun. 19, 2009, 11 pages.

Notice of Allowance received for U.S. Appl. No. 11/171,859, mailed on Oct. 6, 2009, 18 pages.

Notice of Allowance, received for U.S. Appl. No. 11/173,587, mailed on May 1,2009, 11 Pages.

Notice of Allowance received for U.S. Appl. No. 11/173,851 mailed on Aug. 13, 2009, 38 Pages.

Notice of Allowance received for U.S. Appl. No. 11/322,869, mailed on Mar. 8, 2010, 19 pages.

Notice of Allowance received for U.S. Appl. No. 11/428,335, mailed on Apr. 24, 2009, 15 Pages.

Office Action received for U.S. Appl. No. 11/174,315, mailed on Sep. 1, 2009, 29 Pages.

Office Action received for U.S. Appl. No. 11/428,335, mailed on Oct. 20, 2008, 34 Pages.

Office Action received for U.S. Appl. No. 11/173,587, mailed on Dec. 5, 2008, 9 Pages.

Office Action received for U.S Appl. No. 11/171,859 mailed on Jan. 21, 2009, 9 Pages.

Office Action received for U.S. Appl. No. 11/173,815, mailed on Jun. 20, 2007, 31 Pages.

Office Action received for U.S Appl. No. 11/174,315, mailed on Feb. 17, 2009, 18 Pages.

Office Action received for U.S Appl. No. 10/881,777, mailed on Sep. 5, 2007, 33 Pages.

Office Action received for U.S. Appl. No. 11/173,851, mailed on Apr. 1, 2009, 34 Pages.
Office Action received for U.S. Appl. No. 11/322,669, mailed on Aug. 21, 2009, 31 Pages.
Office Action received for U.S. Appl. No. 11/173,885, mailed on Dec. 14, 2009, 68 Pages.
Office Action received for U.S. Appl. No. 11/173,142, mailed on Feb. 13, 2008, 17 Pages.
Office Action received for U.S. Appl. No. 11/173,851, mailed on Jan. 21, 2010, 38 Pages.
Office Action received for U.S. Appl. No. 11/173,142, mailed on Jul. 15, 2009, 19 Pages.
Office Action received for U.S. Appl. No. 11/428,335, mailed on Jun. 20, 2007, 44 Pages.
Office Action received for U.S Appl. No. 11/173,142, mailed on Jun. 7, 2007, 26 Pages.
Office Action received for U.S. Appl. No. 11/428,335, mailed on Mar. 6, 2008, 31 Pages.
Office Action received for U.S Appl. No. 11/173,142, mailed on Oct. 22, 2008, 25 Pages.
Office Action received for Chinese Patent Application No. 200911000268.0, mailed on Dec. 23, 2011, 3 pages of Office Action and 2 pages of English Translation.
Office Action received for European Patent Application No. 09252894.2, mailed on Jan. 17, 2011, 9 pages.
Office Action received for Japanese Patent Application No. 2009-293555, mailed on Jul. 12, 2011, 1 page of Office Action and 1 page of English Translation.
Office Action received for Japanese Patent Application No. 2009-293555, mailed on Nov. 1, 2011, 2 pages of Office Action and 1 pages of English Translation.
Office Action Received for Korean Patent Application No. 10-2009-131006, mailed on Mar. 18, 2011, 4 pages of Office Action and 4 pages of English Translation.

Red Hat, Inc. "Red Hat Enterprise Linux 4: Using as, the Gnu Assembler", copyright 2003, 280 Pages.
Sheveley, "Enhanced Virtualization on Intel Architecture-Based Servers", Technology@Intel magazine, Apr. 2005, 9 Pages.
The PC Guide, "Direct Memory Access (DMA) Modes and Bus Mastering DMA", Site Version: 1.10.1, Aug. 15, 1999, 2 Pages Available at: http://mrkay.org/zenpc/ref/hdd/if/ide/modesDMA-c.html.
Tools Interface Standards (TIS), "Executable and Linkable Format (ELF)", Portable Formats Specification, Version 1.1, Oct. 1993, 60 pages.
Uhlig, et al., "Intel Virtualization Technology", IEEE Computer Society, May 2005, pp. 48-56.
Wagle, et al., "StackGuard: Simple Stack Smash Protection for GCC", Imunix, Inc. GCC Developers Summit 2003, 14 Pages.
Webopedia, "Bus", Dec. 1, 2002, 2 Pages Available at: http://www.webopedia.com/term/B/bus.html.
Webopedia, "Kernel", Mar. 12, 2002, 2 Pages Available at: http://www.webopedia.com/TERM/K/kernel.html.
Yan, et al., "Improving Cost, Performance, and Security of Memory Encryption and Authentication", International Symposium on Computer Architecture (ISCA), 2006, 12 Pages.
Zhang, "Memory Management in JikesNode Operating System", 2005, A thesis submitted to the University of Manchester for the degree of Master of Science in the Faculty of Science and Engineering, 1 Page Available at: http://www.citeulike.org/user/robertburrelldonkin/article/6743255.
Office Action Received for Korean Patent Application No. 10-2009-131006, mailed on Jul. 31, 2012, 3 pages of Office Action and 3 pages of English Translation.

* cited by examiner

METHODS AND SYSTEMS TO DIRECTLY RENDER AN IMAGE AND CORRELATE CORRESPONDING USER INPUT IN A SECURE MEMORY DOMAIN

BACKGROUND

When confidential user information, such as electronic payment transaction information, is input to a computer system through a mechanical keyboard or pointing device, the information may be vulnerable to malware, such as spyware, which may record keystrokes or input coordinates as they are transmitted to or within the computer system.

An application program associated with receiving of confidential user information may also be vulnerable to malware, such as spyware.

BRIEF DESCRIPTION OF THE DRAWINGS/FIGURES

In the drawings, the leftmost digit(s) of a reference number identifies the drawing in which the reference number first appears.

DETAILED DESCRIPTION

Figure 1:
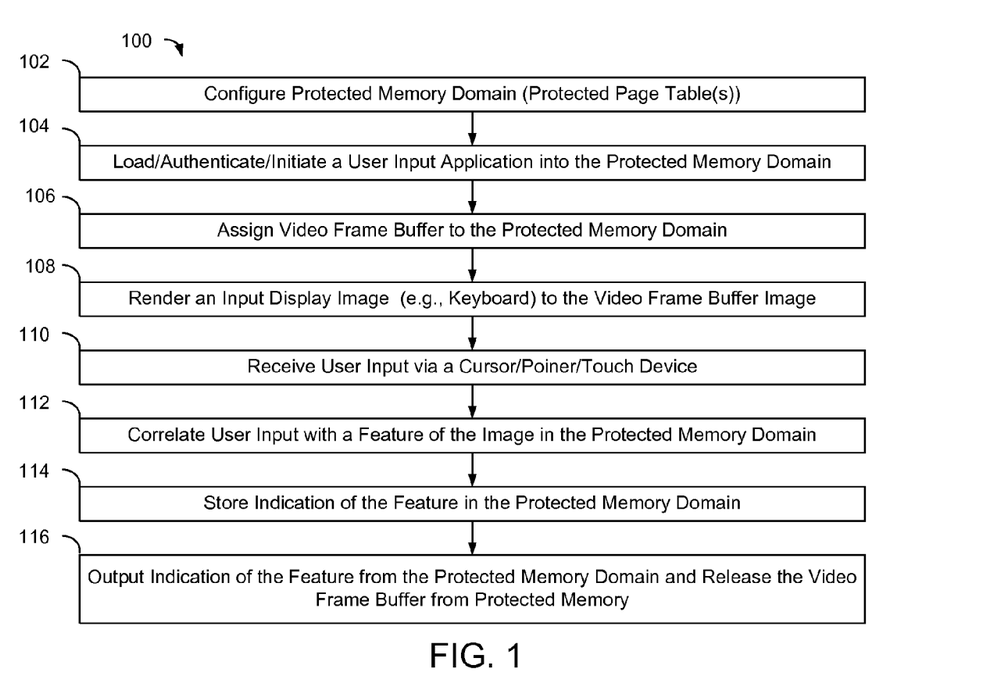
FIG. 1 is a process flowchart of an exemplary method of rendering a data entry image and correlating user input with the rendered image in a protected memory domain.

FIG. 1 is a process flowchart of an exemplary method 100 of rendering a data entry image and correlating user input with the rendered image in a protected memory domain.

At 102, an access-protected memory domain is configured within a computer system. Access to the protected memory domain is restricted in accordance with one or more rules to substantially insure that data and instructions within the protected memory domain are inaccessible to processes outside of the protected memory domain. The protected memory domain may include one or more portions of system memory, graphics memory, and combinations thereof. The protected memory domain may be configured and enforced under control of software, hardware, and combinations thereof, including virtual machine management technology.

At 104, an application is initiated in the protected memory domain. The application may include instructions to cause a processor of the computer system to render a data entry image, such as a keyboard image, and to correlate subsequent user input with the image, in the protected memory domain.

The application may authenticated prior to initiation, using software, hardware, and combinations thereof, and may be authenticated in accordance with one or more hashing techniques including code signature hashing techniques, which may include a trusted execution technology.

The application may be loaded into the secure memory domain and authenticated in the secure memory domain. Alternatively, or additionally, the application, or a portion thereof may be loaded into another secure memory domain, such as access-protected firmware associated with a trusted execution technology module.

The protected memory domain and the authenticating of the application, alone or in combination with one another, may protect the application, including code, control flow, and data structures associated with the application from malicious code, including spyware, even when a corresponding operating system under which the application is launched, is compromised such as by a rootkit, virus, worm, or spyware.

Configuring of the protected memory domain at 102, and/or loading, authenticating, and initiating of the application at 104, may be performed under control of a hypervisor-based security visor that protects in-memory components from snooping and modification by malicious code.

The hypervisor-based security visor may be configured to identify code and/or data, to measure one or more features associated with the code and/or data for authenticity, and to protect authenticated code and/or data.

The hypervisor-based security visor may be configured to operate without modification to an operating system.

The hypervisor-based security visor may include an integrity measurement module (IMM) to run in a protected space outside a boundary of an operating system, and thus outside bounds of potential malware in the operating environment. IMM protected space may include protected hardware and/or a protected virtual machine (VM) running above a virtual machine manager (VMM). The IMM may be configured to verify an identity and integrity of code of the application against a signature file containing a hash of sections of the code, such as a SHA-1 hash, and to verify entry points into the code sections and a corresponding relocation table.

The hypervisor-based security visor may include a memory protection module (MPM) to enforce memory access protections, and the IMM may be configured to signal the MPM to enforce the memory access protections after the IMM has successfully identified and measured the application.

The MPM may be configured to create one or more protected page tables (PPTs) and to map the protected code of the application and corresponding data pages to the PPTs, and to sever corresponding mapping from active page tables (APTs). A memory manager, such as a VMM, may be configured to manage a list of virtual address range of protected memory and the corresponding physical addresses of protected pages. Upon a page fault, the VMM may be configured to compare the virtual address of a destination page with the list of protected page addresses, and when a match is found, to switch a page table base register (PTBR) in a virtual machine control structure (VMCS) to the address of the PPT base address. On return, the VMM may be configured to switch the PTBR from the PPT address to the APT base. The VMM may check the list of physical page addresses each time the VMM attempts to add a page to the APTs. When the VMM finds a protected page, the VMM may decline to add the protected page to the APT and may generate an error indication. When the memory protections are configured, an initialization vector associated with the application may be the first code section to execute within the protected application domain.

The hypervisor-based security visor may include a VT Integrity Services for Networking (VISN) system, developed my Intel Corporation.

At 106, a video frame buffer is assigned to the protected memory domain.

The application may be configured to pull a video frame buffer corresponding to a graphics adapter into the protected memory domain, and to directly render to the video frame buffer. One or more video frame back buffers and/or other surfaces may also be assigned to the protected memory domain. While in the protected memory domain, the video frame buffer, including any back buffers and other surfaces, may be substantially protected from write and/or read processes initiated by the operating system and other processes outside of the protected memory domain. Correspondingly, the video frame buffer, including any back buffers and other surfaces may be substantially immune to malware running on the computer system, regardless of a privilege level of the malware.

The application may be configured to identify or determine a memory address corresponding to a primary or video frame front buffer and one or more video frame back buffers, to remove corresponding pages from APTs associated with an operating system (OS), and to place the pages in PPTs along with the protected parts of the application and other protected code and data pages. As a result screen scraping applications/malware may be precluded from reading from and writing to the protected pages.

The application may be configured to perform direct graphics rendering, such as that provided by DirectX and OpenGL in Microsoft Windows and OpenGL in Linux OS. Corresponding libraries may be accessed to find address corresponding to the video frame buffer and to remove read and write restrictions that may exist with respect to applications running under the OS.

The initiation of the application in the protected memory domain at 102 may include protecting at least code, and data sections for the code, that are responsible for writing to and/or reading from the video frame buffer.

Assigning the video frame buffer to the protected memory domain at 106 may include identifying a location of a pointer to the video frame buffer, or an APT translation corresponding to the pointer.

Locating a pointer to the video frame buffer may include using an application programming interface (API) associated with an operating system to determine a virtual address of the pointer. A corresponding physical address may be identified from a page table maintained by an operating system or VMM.

Locating a pointer to the video frame buffer may include obtaining a physical address of the pointer and walking through the corresponding process address space, such as a page table to find the physical address and the corresponding virtual address. The physical address of the pointer may be mapped to a known physical address, such as address 0XA000. This may include a hypercall for each step.

The virtual address and corresponding physical address may be pulled into one or more PPTs. The pulling of the video frame buffer into the PPTs may include marking the corresponding memory pages as not-present in the APTs, and marking the memory pages as read/write in the PPTs.

At 108, an image of a user input device is rendered to the video frame buffer. The image may include an image of a keyboard, which may include one or more of an image of a numeric keyboard, an alphabetical keyboard, and an alphanumeric keyboard.

The image of the user input device may be loaded and authenticated in the protected memory domain, as part of the loading of the application at 102.

A graphics adaptor may be configured to render from one or more of memory within the graphics adaptor, video RAM (VRAM) in the case discrete graphics adaptors, shared system memory (system RAM) and, in the case of an embedded graphics adaptor, may be configured share system RAM with a general purpose processor or a combination thereof, such with an advance graphics aperture (AGP).

A graphics card may be configured to normally use local VRAM, and to use system RAM when the local VRAM is insufficient for processes running on the system. A graphics card may render from one or more primary video frame buffers. Content of the video frame back buffers may be blitted to a primary buffer or an application may declare a chain of back buffers and flip the back buffers to the primary buffer in a chain.

For secure input and output, a ring-3 application may declare multiple surfaces, which may include texture, when rendering the keyboard.

The graphics card and/or a corresponding display may include security protections.

At 110, user input is received in the protected memory domain subsequent to the rendering of the input display image. The user input may include a positional indication, which may be generated by one or more of a pointing device, a cursor device such as a mouse device, a touch pad, and a touch screen display.

At 112, the user input is correlated with a feature of the input display image. The correlating may include correlating coordinates of the user input with a key of a rendered keyboard image to identify a user-selected key of the keyboard.

At 114, an indication of the image feature that correlates to the user input is stored in the protected memory domain. Where the image includes a keyboard image, the storing may include storing an indication of a user-selected key.

At 116, the stored indication of the user input may be output from the protected memory domain, and the video frame buffer may be released from the protected memory.

Figure 2:
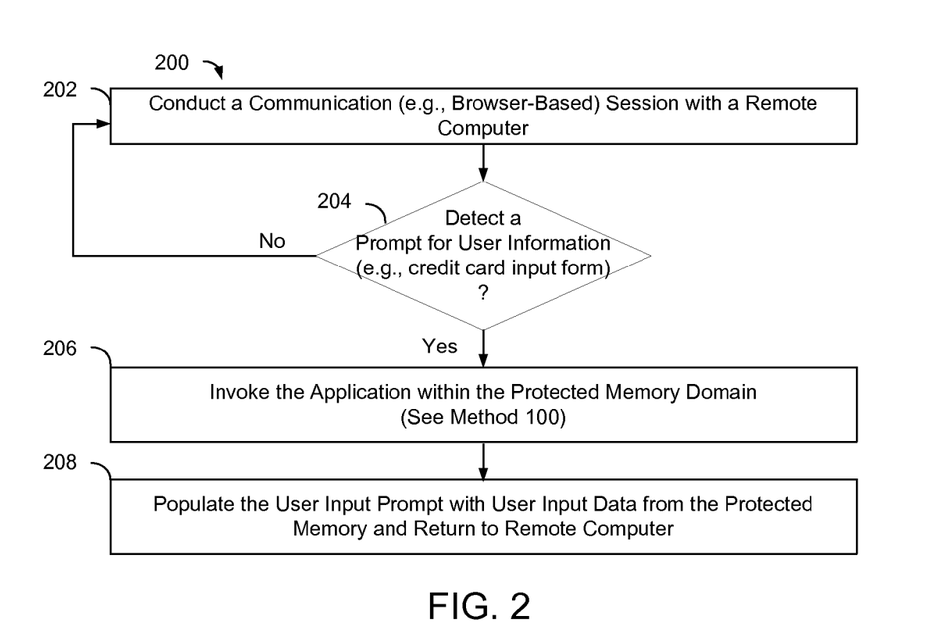
FIG. 2 is a process flowchart of an exemplary method of invoking the method of FIG. 1 to perform a payment transaction over a network connection.

Method 100 may be invoked to receive confidential user-input, such as electronic payment information. FIG. 2 is a process flowchart of an exemplary method 200 of invoking method 100 to conduct a payment transaction over a network connection.

At 202, a communication session is conducted over a network between a user-computer system and another computer system, which may be remote relative to the user-computer system. The communication session may, for example, be conducted through a web browser running on the user-computer system, with a merchant web site or a financial card processor web site, over the Internet.

At 204, a prompt for user information received from the remote computer system and detected at the user computer system.

Detecting of the prompt at 204 may include detecting a prompt for electronic payment information, such as credit card information, debit card information, or other payment authorization information.

Detecting of the prompt at 204 may include detecting one or more standardized payment prompts, such as an industry-standard hypertext mark-up language (HTML) credit card form.

Detecting of the prompt at 204 may include searching incoming web pages for data entry fields that are common to credit card payment transactions, such as credit card number fields, date fields, and monetary denomination fields.

The prompt may be detected by an application running on the user computer system, such as a web browser. Computer readable instructions to detect a prompt may be implemented as a browser plug-in to work with a browser application, and may be implemented relatively seamlessly with little or no modification to a merchant website or a financial card processor web site.

Detecting of the prompt may include intercepting a secure sockets layer (SSL) channel or transport layer security (TLS) channel between a browser running on a user computer system and a merchant web site or a financial card processor web site.

The prompt may be detected by a VMM running on the user computer system.

At 206, an application is invoked in response to a detected prompt for user information. Invoking of the application at 206 may include performing method 100, or a portion thereof, and may include obtaining credit card information and payment authorization from a user in the protected memory domain.

At 208, the prompt is populated with user input data from the protected memory domain, and is returned to the requestor.

Returning to FIG. 1, rendering at 108 may include rendering the input display image to a relatively random or pseudo random position, and may include re-rendering the image to another random position following a user input. The random positioning may include one or more of true random positioning, pseudo-random positioning, and positioning to one of a plurality of pre-determined positions. Random positioning may help to reduce an ability of spyware or other malicious code to correlate user input with the rendered image.

Figure 3:
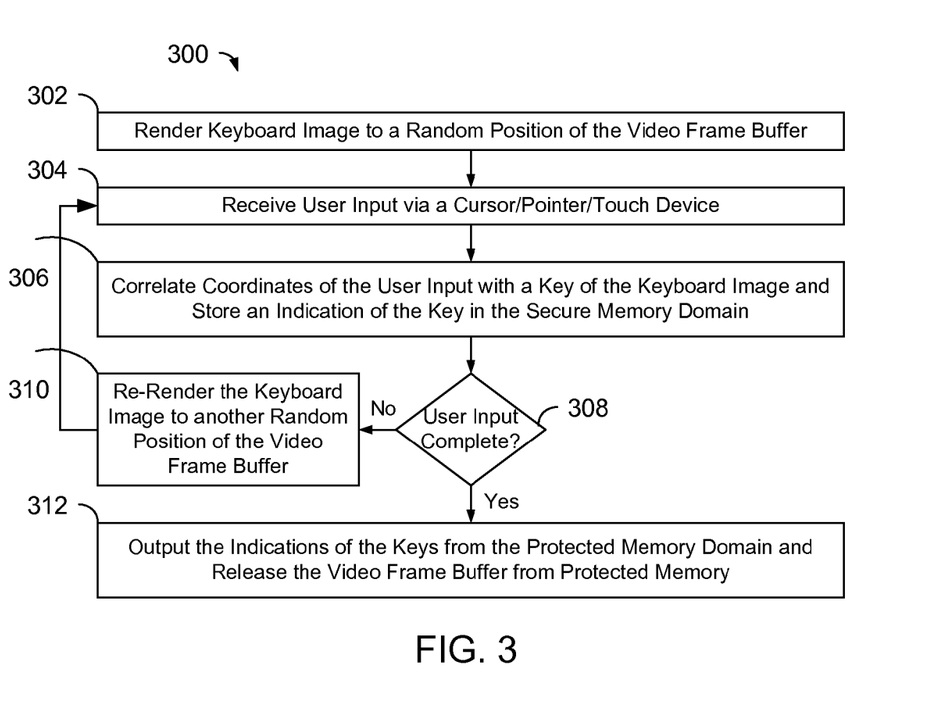
FIG. 3 is a process flowchart of an exemplary method of rendering an image to a random position of a display and re-rendering the image to another random position of the display following a user input.

FIG. 3 is a process flowchart of an exemplary method 300 of rendering an image to a random position and re-rendering the image to another random position following a user input. Method 300 may be preceded 102 through 106 in FIG. 1.

At 302, a keyboard image is rendered to a random position of the video frame buffer. The keyboard image may have a size that is smaller than a size of the video frame buffer, to allow rendering to multiple random positions within the video frame buffer.

At 304, user input is received, such as described above with respect to 110 in FIG. 1.

At 306, coordinates of the user input are correlated with the rendered keyboard image and corresponding indications of user selected keys are stored in the protected memory, such as described above with respect to 112 and 114 in FIG. 1.

At 308, when the user is to provide additional input, the keyboard image is re-rendered at 310 to another random position in the video frame buffer. The receiving of user input at 304 and the correlating and storing at 306 may be repeated until user data input is complete. The keyboard image may be re-rendered to another random position following each user input. For example, where the user is to input a multi-digit sequence, the keyboard image may be re-rendered to another random position following each digit entry.

The keyboard image may include an image of a user data entry complete key, to permit a user to indicate that data entry is complete.

When user data input is complete at 308, the stored indications of user selected keys may be output from the protected memory domain, and the video frame buffer may be released from the protected memory domain at 312.

Figure 4:
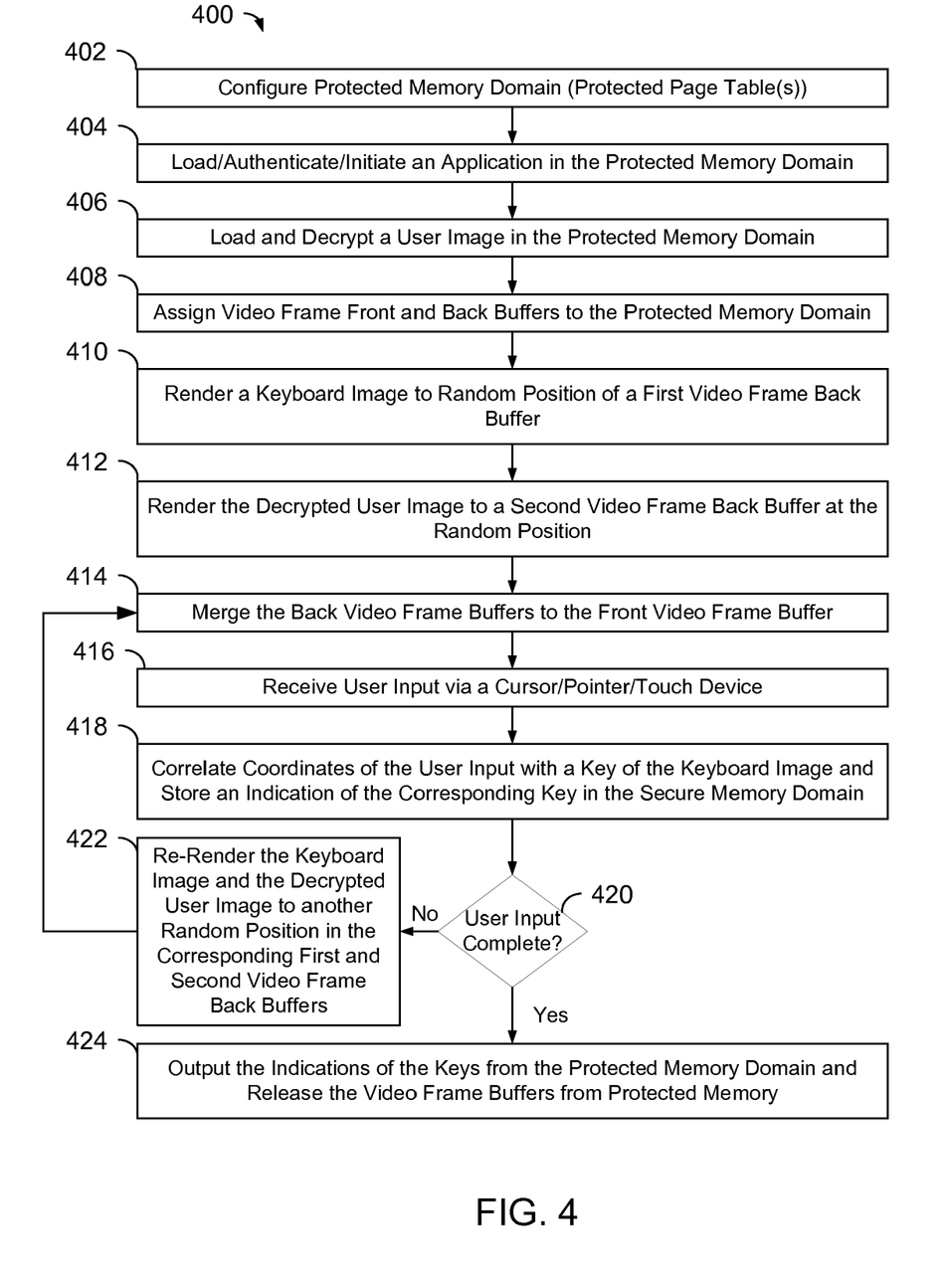
FIG. 4 is a process flowchart of an exemplary method of rendering an input display image over a user image, in a secure memory domain.

Referring back to FIG. 1, rendering of the input display image at 108 may include rendering the input display image over a user image. The user image may be selected by the user and associated with the application in advance, as a security measure. FIG. 4 is a process flowchart of an exemplary method 400 of rendering an input display image over a user image.

At 402, a protected memory domain is configured, such as described above with reference to 102 in FIG. 1.

At 404, an application is initiated in the protected memory domain, such as described above with reference to 104 in FIG. 1.

At 406, a user image or bitmap is loaded into the protected memory domain. The user image may be retrieved as an encrypted user image from a storage device, such as a hard drive. The encrypted user image may be loaded and decrypted in the protected memory domain.

Decryption may be performed under control of the application initiated at 404, and a decryption key may be provided to the application by a security visor module upon authentication or validation of code and/or static data sections of the application.

At 408, a video frame front buffer and first and second video frame back buffers are assigned to the protected memory domain.

At 410, a keyboard image is rendered to a random position of the first video frame back buffer, such as described above with respect to 302 in FIG. 3.

At 412, the user image is rendered to the second video frame back buffer, at a position corresponding to the random position of the keyboard image in first video frame back buffer. The user image may have a size that is larger than the size of the keyboard image and smaller than a size of the video frame front buffer.

At 414, the first and second video frame back buffers are merged to the video frame front buffer. The merging may include overlaying a portion of user image with the keyboard image. The merging may be performed as a bit block transfer (BitBlt) or block image transfer (Blit), in which multiple bit maps are combined using a rastering operation.

At 416, user input is received, such as describe above with respect to 110 in FIG. 1.

At 418, coordinates of the user input are correlated with the rendered keyboard image and stored in the protected memory, such as described above with respect to 112 and 114 in FIG. 1.

At 420, when the user is to provide additional input, the keyboard image and the user image are re-rendered at 422 to another random position in the corresponding first and second video frame back buffers.

The merging at 414, the receiving of user input at 416, and the correlating and storing at 418 may be repeated until user data entry is complete. The keyboard image and the user image may be re-rendered to another random position following each user input.

When user data input is complete at 420, the stored indications of user selected keys may be output from the protected memory domain, and the video frame buffer may be released from the protected memory domain at 424.

When user data entry is complete, an acknowledgment image may be rendered to a random position to permit a user to complete a corresponding transaction.

Figure 5:
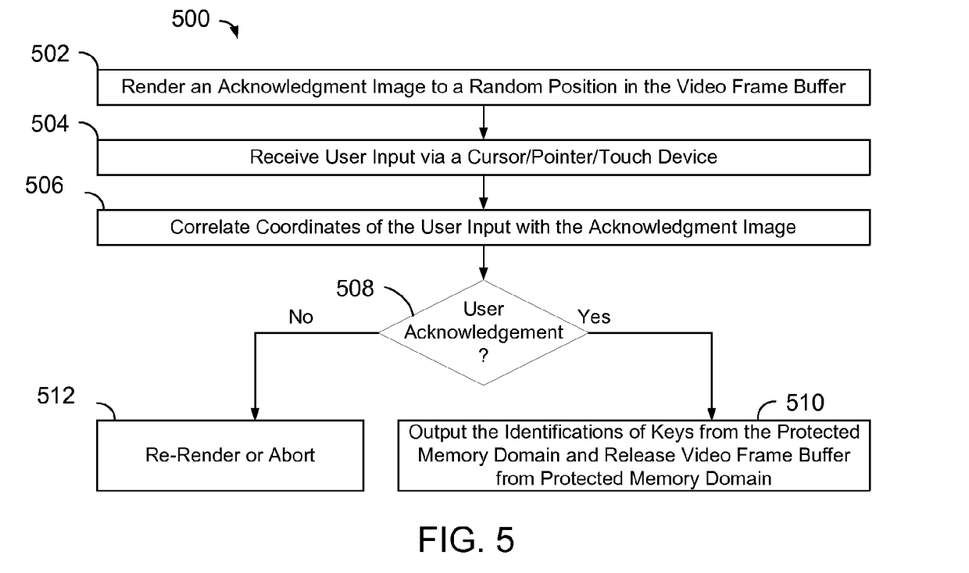
FIG. 5 is a process flowchart of an exemplary method of rendering an acknowledgment image to a random position of a display.

FIG. 5 is a process flowchart of an exemplary method 500 of rendering an acknowledgment image to a random position of video frame buffer. Method 500 may be implemented following a completion of user data entry, such as after 114 in FIG. 1, 308 in FIG. 3, and 420 in FIG. 4.

At 502, an acknowledgment image is rendered to a video frame buffer in a protected memory domain. The acknowledgment image may be rendered over a user image, such as described above with respect to FIG. 4.

At 504, user input is received, such as described above at 110 in FIG. 1.

At 506, coordinates of the user input are correlated with the rendered acknowledgment image.

At 506, where the coordinates of the user input correlate to the acknowledgment image, corresponding user input data, such as indications of user selected keys, may be output from the protected memory domain and the video frame buffer may be released from the protected memory domain at 510.

Where the coordinates of the user input do not correlate to the acknowledgment image at 506, one or more actions may occur. For example, the acknowledgement image may include one or more of a cancel transaction image and an edit data image, to permit a user to elect to cancel the transaction or edit the transaction.

One or more methods described above may include counting user inputs that do not correlate to a rendered image and aborting a transaction when the number of non-correlated inputs exceeds a threshold. This may help to thwart click-everywhere attacks.

Figure 6:
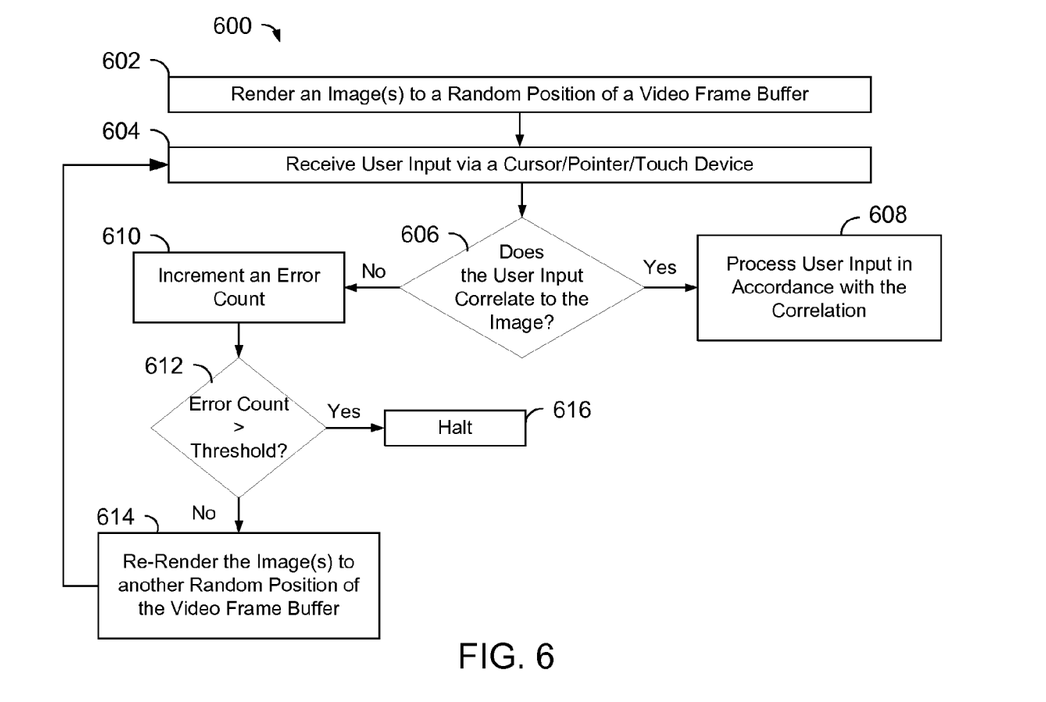
FIG. 6 is a process flowchart of an exemplary method of aborting a transaction when a number of user inputs that do not correlate to a rendered image exceed a threshold.

FIG. 6 is a process flowchart of an exemplary method 600 of detecting non-correlated user inputs. Method 600 may be implemented with respect to one or more other methods disclosed herein.

At 602, an image is rendered to a random position of a video frame buffer. The image may include one or more of an input display image, an acknowledgement image, and a user image.

At 604, user input is received.

At 606, a determination is made as to whether the user input correlates to the rendered image.

Where the user input correlates to the rendered image at 606, processing proceeds to 608 where the user input is processed in accordance with the correlation. This may include one or more of correlating at 112 in FIG. 1, correlating at 306 in FIG. 3, correlating at 418 in FIG. 4, and correlating at 506 in FIG. 5.

Where the user input does not correlate to the rendered image, processing proceeds to 610, where an error count is incremented.

At 612, when the error count is below a threshold, the image may be re-rendered to another random position at 614, and processing may return to 604 to receive another user input.

When the error count is above the threshold at 612, one or more processes may be halted or terminated at 616. This may include one or more of terminating a corresponding network connection, excising contents of the video frame buffer and/or previously entered user data, sending an alert or report to an administrator, and terminating the application.

Figure 7:
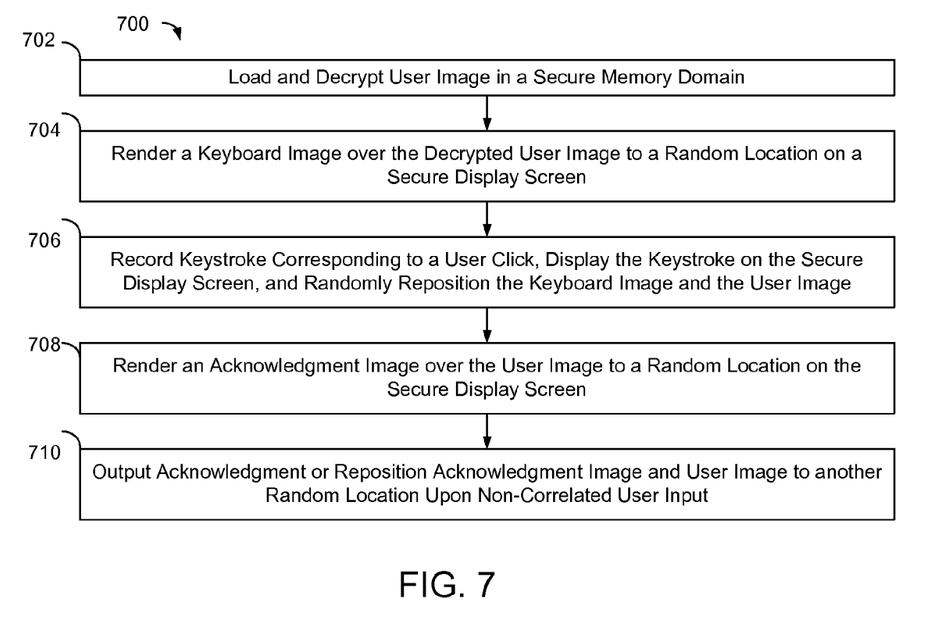
FIG. 7 is a process flowchart of another exemplary method of rendering a data entry image and correlating user input with the rendered image in a protected memory domain.

FIG. 7 is a process flowchart of an exemplary method 700 of rendering a data entry image and receiving user input selections corresponding to the image in a protected memory domain. One or more features of method 700 may be implemented in combination with one or more features disclosed with respect to one or more other methods herein.

At 702, an encrypted or otherwise protected user image is loaded and decrypted in a secure memory domain. The secure memory domain may be configured using one or more protected page tables. The user image may be similar to a site key.

At 704, a keyboard image is rendered on top of the user image to a random location on a secure display screen. The keyboard image may be blitted on top of the user image. The combination of the keyboard image and the underlying user are referred to herein as a secure input screen.

At 706, when a user clicks over the keyboard image, a corresponding keystroke is recorded and displayed in an output area on the secure display screen, and the secure input image is randomly relocated to another position. This may protect against guessing attacks from an attacker.

The user may enter a credit card/bank card number through the secure input screen. Alternatively, or additionally, the user may enter a personal identification number (PIN) to access a secure value of information, such as a credit card number. The secret value may be secured with an access key, such as described above with respect to an encrypted user image. The access key may be secured as a security visor secret platform key, to be revealed to an authenticated application. The application may be configured to use the PIN to unlock the secret value. This may reduce the amount of data to be entered by a user and may increase security of a transaction.

At 708, upon completion of user data entry, an acknowledgment image is rendered to the secure display screen to prompt the user to acknowledge the transaction parameters. The acknowledgment image may be rendered over the user image, as described above. The combination of the acknowledgment image and the underlying user image are referred to herein as a secure acknowledgment screen.

The secure acknowledgement screen may be viewed as another surface in the protected memory domain, which is rendered when the user has completed entry of credential and transaction information. The secure acknowledgement screen may include transaction information, such as a merchant name, monetary value of the transaction, date, and credentials to be sent to the merchant or card processor site. The secure acknowledgement screen may include one or more lines to display information.

At 710, when the user clicks over the acknowledgement image, the previously entered keystrokes or other corresponding user information may be output from the secure memory domain. The keystrokes or other user information may be output to a merchant network site or credit card processor network site.

The keystrokes or other user information may be encrypted and signed prior to outputting. The transaction information may be encrypted, such as with a public key of the merchant or card processor, and may be signed with a private key of the user. A hashing function may be applied to one or more of a monetary value of the transaction, a credit card number entered by the user, a transaction count, and merchant information, to generate a secure transaction value. The secure transaction value may be sent to the merchant or card processor.

The merchant or card processing network site may be authenticated at the user-computer, such as by a certificate. This may help to thwart phishing attacks.

The acknowledgement image may be randomly positioned, and may be randomly repositioned following a user click that does not correlate to the acknowledgment image. This may preclude an attacker from determining a location of the acknowledgement image from an analysis of previous clicks. The transaction may be aborted when a number of uncorrelated user clicks exceed a threshold number. This may help to thwart brute force, click everywhere attacks.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 8:
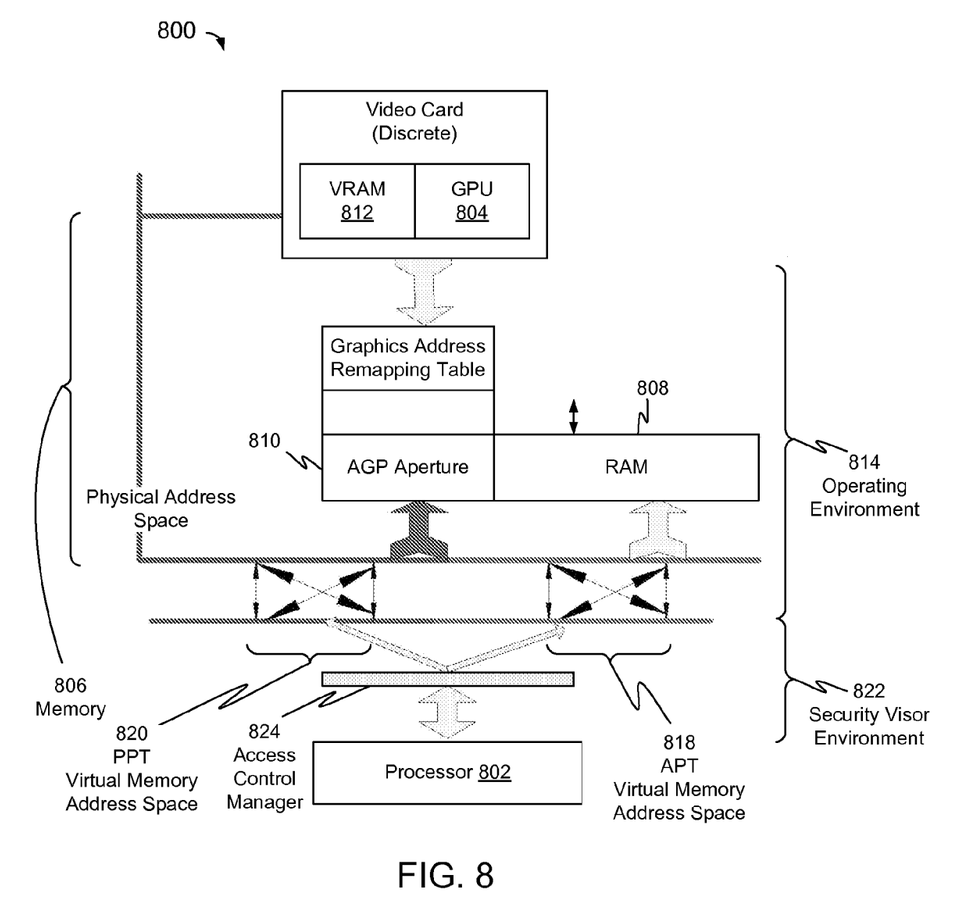
FIG. 8 is a graphical illustration of an exemplary computer environment.

FIG. 8 is a graphical illustration of an exemplary computer environment 800, including one or more computer instruction processing units, illustrated here as a processor 802 and a graphics processor GPU 804, to execute computer program logic. Processor 802 may include one or more general purpose processors and/or processor cores.

Computer system 800 includes memory 806, which may include one or more of video memory or VRAM 812 and physical system memory or random access memory (RAM) 808, which may include advanced graphics processing (AGP) aperture memory 810. AGP aperture memory 810 may be used by GPU 804 in addition to VRAM 812.

Memory 806 may include a computer readable medium having computer program product logic or instructions stored thereon, to cause one or more of processor 802 and GPU 804 to perform one or more functions in response thereto.

Physical addresses of memory 806, or portions thereof, may be virtualized with respect to one or more operating environments 814 and applications. Memory mappings between virtual-to-physical memory addresses may be maintained in one or more active page tables (APTs) 818.

One or more access-protected memory domains may be configured within memory 806, and corresponding memory address mappings may be maintained in one or more protected page tables (PPTs) 820.

APTs 818 and PPTs 820 may be configured and enforced within a security visor environment 822 under control of an access control manager 824.

Figure 9:
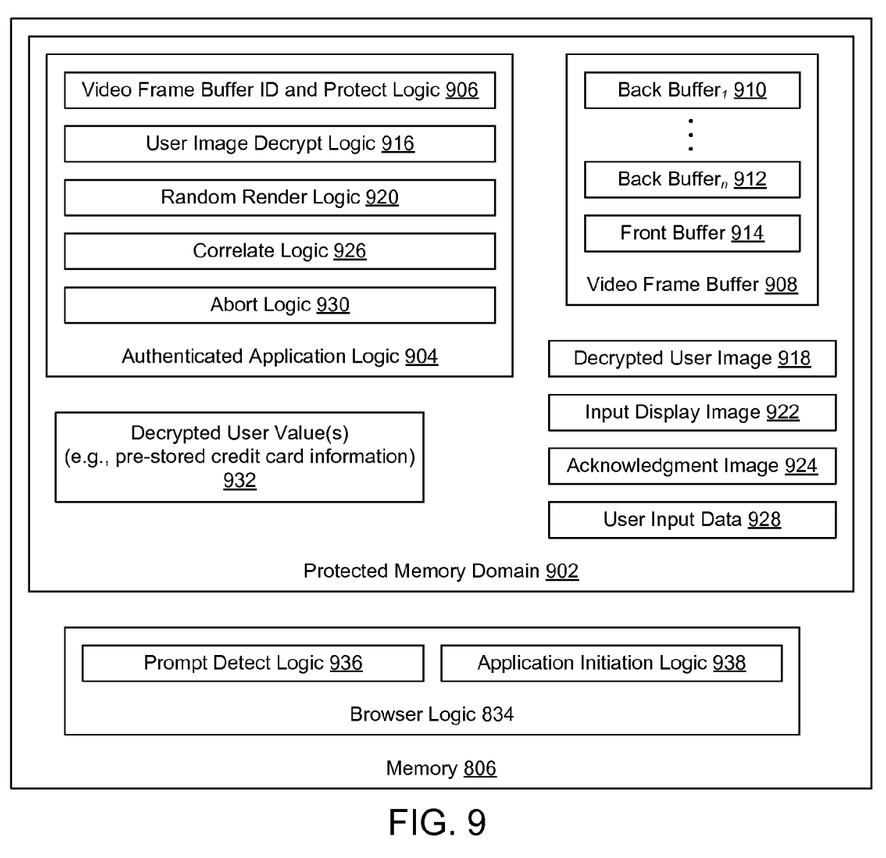
FIG. 9 is a block diagram of exemplary logic and data corresponding to the exemplary computer environment of FIG. 8.

FIG. 9 is a block diagram of exemplary logic and data corresponding to memory 806 in FIG. 8.

In FIG. 9, memory 806 includes a protected memory domain 902, which may be configured with PPTs 820.

Protected memory domain 902 includes application logic 904, which may be authenticated, such as described above with respect to 104 in FIG. 1.

Application logic 904 may include video frame buffer identify and protect logic 906 to cause processor 802 identify a location or address mapping corresponding to a video frame buffer, or of a pointer to the video frame buffer, and to access-protect the video frame buffer, such as described above with respect to 106 in FIG. 1. In the example of FIG. 9, a video frame buffer 908 is illustrated within protected memory domain 902. Video frame buffer 908 may include one or more back buffers 910 through 912, and a primary or front buffer 914.

Application logic 904 may include user image decrypt logic 916 to cause processor 802 to retrieve an encrypted user image into protected memory domain 902, and to decrypt the user image, such as described above with respect to 406 in FIG. 4. In the example of FIG. 9, a decrypted user image 918 is illustrated within protected memory domain 902.

Application logic 904 may include random render logic 920 to cause processor 802 to render an input display image 922 to a random position of video frame buffer 908, such as described above with respect to FIG. 3. Random render logic 920 may include logic to cause processor 802 to render input display image 922 and decrypted user image 918 to a random position in back buffers 910 and 912, respectively, and to merge or blit the images from back buffers 910 and 912 to front buffer 914, such as described above with respect to FIG. 4.

Random render logic 920 may include logic to cause processor 802 to render an acknowledgment image 924 to a random position of video frame buffer 908, such as described above with respect to 502 in FIG. 5. Random render logic 920 may include logic to cause processor 802 to render acknowledgment image 924 and decrypted user image 918 to a random position in back buffers 910 and 912, respectively, and to merge or blit the images from back buffers 910 and 912 to front buffer 914, such as described above with respect to FIGS. 4 and 5.

Application logic 904 may include correlate logic 926 to cause processor 802 to correlate user input with rendered images, and to store corresponding user input in protected memory domain 902 as user input data 928, such as described above with respect to 112 and 114, respectively, in FIG. 1.

Application logic 904 may include abort logic 930 to cause processor 802 to count user inputs that do not correlate to a rendered image, and to abort one or more portions of application logic 904 when a number of non-correlated user inputs exceeds a threshold, such as described above with respect to FIG. 6.

Application logic 904 may include logic to cause processor 802 to retrieve an encrypted user value, such as credit card information, into protected memory domain 902, and to decrypt the user value, such as described above with respect to FIG. 7. In the example of FIG. 9, a decrypted user value 932 is illustrated within protected memory domain 902.

Memory 806 may include browser logic 934 to cause processor 802 to interface with one or more remote computer systems over a network. Browser logic 934 may include prompt detect logic 936 to cause processor 802 to detect a prompt from a remote computer system, such as a prompt for electronic payment information, such as described above with respect to 204 in FIG. 2. Browser logic 934 may include application initiation logic 938 to cause processor 802 to initiate application logic 904 in protected memory domain 902, and to populate the prompt with user input data 928, such as described above with respect to 206 in FIG. 2. One or more of prompt detect logic 936 and application initiation logic 938, or portions thereof, may be implemented within a VMM.

Methods and systems disclosed herein may be implemented with respect to other devices that are configurable to communicate information to a computer system including, without limitation, biometric scanners.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein.

Thus, the breadth and scope of the claims should not be limited by any of the exemplary embodiments disclosed herein.

What is claimed is:

1. A method, comprising:

executing an application program, by a processor, in an access-protected memory domain of a first computer system comprising the processor;

assigning a video frame buffer of the first computer system to the access-protected memory domain, by the application program;

loading and decrypting, by the application program, a user image in the access-protected memory domain;

rendering a keyboard image over at least a portion of the decrypted user image to a random position in the video frame buffer;

correlating, by the application program, coordinates of a user input with a key of the rendered keyboard image;

storing, by the application program, an indication of the key in the access-protected memory domain;

re-rendering the keyboard image over at least a portion of the decrypted user image to another random position in the video frame buffer in response to the user input;

repeating the correlating and the storing with respect to an another user input; and outputting, by the application program, the indications of the keys from the access-protected memory domain.

2. The method of claim 1, further including:

maintaining translations between physical addresses and virtual addresses associated with the video frame buffer, the keyboard image, and the application program and corresponding data in one or more protected page tables;

limiting access to the protected page tables substantially to the application program; and identifying a translation between a physical address and a virtual address associated with a pointer to the video frame buffer as unavailable in an active page table.

3. The method of claim 1, further including loading and authenticating at least a portion of the application program in the access-protected memory domain under control of a trusted execution module.

4. The method of claim 1, further including:

interfacing between the first computer system and second computer system over a communication network;

detecting a prompt for user information from the second computer system, at the first computer system; and executing the application program in the access-protected memory domain on the processor in response to the detected prompt;

wherein the outputting includes populating the prompt with the indications of the keys and returning the populated prompt to the second computer system over the communication network.

5. The method of claim 1, further including, under control of the processor and the application program:

incrementing an error count when the user input does not correlate to the rendered keyboard image;

aborting at least a portion of the application program when the error count exceeds a threshold; and re-rendering the keyboard image over the decrypted user image to another random position in the video frame buffer when the user input does not correlate to the rendered keyboard image and the error count is below the threshold.

6. The method of claim 1, further including, under control of the processor and the application program:

rendering an acknowledgment image over at least a portion of the decrypted user image to a random position in the video frame buffer when user data entry is complete;

outputting the indication of the keys when the coordinates of the subsequent user input correlates to the acknowledgment image;

incrementing the error count when the subsequent user input does not correlate to the acknowledgment image;

re-rendering the acknowledgment image over at least a portion of the decrypted user image to another random position in the video frame buffer when the subsequent user input does not correlate to the acknowledgment image and the error count is below the threshold; and aborting at least a portion of the application program when the error count exceeds a threshold.

7. The method of claim 1, wherein:

the assigning the video frame buffer to the access-protected memory domain includes assigning a portion of the video frame buffer to the access-protected memory domain and permitting a remaining portion of the video frame buffer to be accessed by one or more processes outside of the access-protected memory domain; and the rendering and the re-rendering are performed with respect to the portion of the video frame buffer assigned to the access-protected memory domain.

* * * * *